United States Patent Office 2,995,903
Patented Aug. 15, 1961

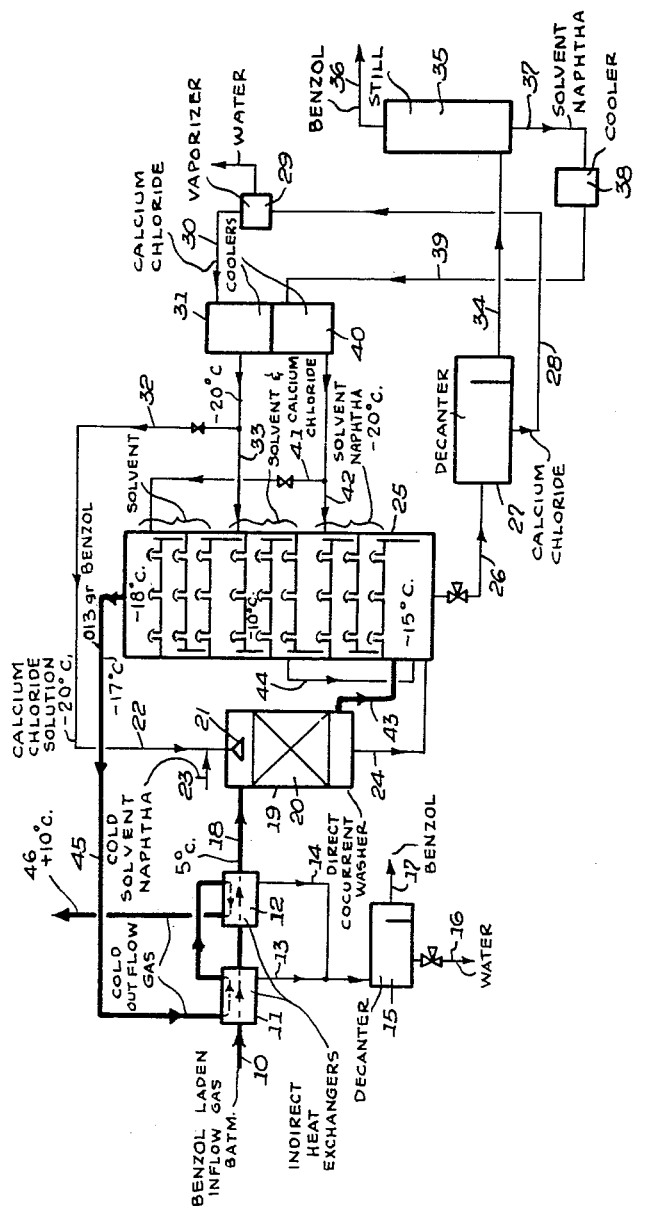

2,995,903
PROCESS FOR RECOVERY OF BENZENE HYDROCARBONS
Adolf Schmalenbach, Essen, Germany, assignor, by mesne assignments, to Koppers Company, Inc., Pittsburgh, Pa., a corporation of Delaware
Filed July 15, 1958, Ser. No. 748,680
2 Claims. (Cl. 62—17)

The present inventin relates to a process for recovery of benzene hydrocarbons from gases under increased pressure, especially coal distillation gases.

A known process for recovery of benzene hydrocarbons from coke-oven gas, for example, consists in: bringing the gas in direct contact at normal or increased pressure with a solvent for benzol, for example the tar fraction, wash oil; and recovering the benzol from the enriched wash oil by distillation. This process is technically applicable per se; however, it requires comparatively high expenditures for the apparatus necessary for carrying out the process and the operating costs are also fairly high.

Therefore, it has already been suggested to condense a portion of the benzol from the gas containing benzol, especially when it is under increased pressure, by direct cooling to below zero by means of intensely cooled calcium chloride liquor, while preventing the condensed benzol from accumulating in crystallized form by the simultaneous presence of a solvent for benzol, for example solvent naphtha. Both the calcium chloride liquor as well as the solvent naphtha are brought in contact with the gas containing benzol at a temperature of about —20° C.

In the practical application of the last-described process operating with intense cooling of the gas, it has been indicated that there are certain difficulties connected with the cooling of the gas to the final temperatures of about —17° C. as a result of the direct contact of the benzol laden gas with the intensely cooled mixture of calcium chloride liquor and solvent naphtha, especially when bubble-cap plate-type columns are used. These difficulties consist of: deposits of ice and in some cases also benzol crystals which are found in the vicinity of the gas passageways of the bubble-cap trays and narrow the free gas passageways, so that an increased loss of pressure inside the column results. While these deposits can be thawed by interrupting the operation for a comparatively short time so that the column is again ready for the intended gas-liquid exchange, these operating interruptions, are, however, detrimental and reduce the output of the plant.

After thorough investigations it has now been found that this process of direct cooling of the gas to a final temperature of about —17° C. by means of calcium chloride liquor in the presence of intensely cooled solvent naphtha not only can be operated without the aforesaid difficulty, but also very low final values for the benzol content are obtained when the gas is cooled below zero degrees in several stages with the first stage operated cocurrent flow and the second stage countercurrent flow with each stage followed by a countercurrent flow with solvent alone.

In detail, the process of the invention consists in: cooling the gas first in cocurrent flow with intensely cooled hygroscopic liquor to a temperature below about —12° C., during which so much slvent is added to the gas that the solidification point of the benzol-solvent solution is about —22° C.; then countercurrently washing the cooled gas with intensely cooled solvent, alone; further cooling the gas in direct countercurrent contact with a mixture of intensely cooled solvent naphtha and calcium chloride liquor; and finally again washing the gas countercurrently with intensely cooled solvent alone.

If the benzol recovery process is performed in the manner of the present invention, a troublefree operation can be established over a long period of time without it being necessary to shut down the plant at intervals for the purpose of thawing deposits of ice or benzol.

An apparatus for performing the process of the invention is diagrammatically illustrated in the drawing.

The gas to be treated, for example coke-oven gas, which is under a pressure of 8 atmospheres and has a benzol content of about 25 gr./cubic meter gas (under standard conditions), is flowed in through line 10 to the heat exchanger 11 in which it is brought in indirect heat exchange with cold, already treated outflow gas and in such cocurrent manner that both gas streams flow in the same direction. The outflow gas then flows in heat exchanger 12 in which the indirect heat exchange takes place in countercurrent flow with the already treated gas coming from heat exchanger 11. By this connection in series of the cocurrent heat exchanger 11 and the countercurrent heat exchanger 12, the gas can be cooled to a temperature of about 5° C. without observing ice deposits in the heat exchangers. In addition to water, a portion of the benzene hydrocarbons is also condensed in both heat exchangers. The condensates flow through lines 13 and 14 into separating tank 15 from which the water is withdrawn through line 16 and a crude benzol (light oil) is withdrawn through line 17.

The gas precooled in this way and which still has a benzol content of about 11 gr. per normal cubic meter of gas flows through line 18 into a cocurrent washer 19. The latter contains a packing 20 of suitable exchange material, for example Raschig rings. Calcium chloride solution at a temperature of about —20° C. is supplied to the cocurrent washer from line 22 through spray 21. A certain amount of solvent naphtha which is also intensely precooled is simultaneously introduced in line 22 through line 23. The amount of solvent naphtha which is added depends on the final temperature which is obtained at the outlet of the direct washer 19 or on the amount of benzol which is condensed inside the direct washer 19. In any case the amount of solvent naphtha is selected so that the solidification point of the mixture of benzol and solvent naphtha inside the direct washer 19 is below the temperature of the calcium chloride solution at the head of the washer. For example, when it is desired that the mixture of the solution consisting of benzol and solvent naphtha inside the cocurrent washer 19 has a solidification point of about —22° C., an amount corresponding to about 25% of the amount of benzene which is condensed in the washer must be introduced in the form of solvent naphtha through line 23. The gas is cooled in the cocurrent washer 19, to a temperature of about —15° C., whereupon its benzol content amounts to about 6 gr. per normal cubic meter. The mixture of calcium chloride solution, solvent naphtha, and benzol dissolved therein flows through line 24 to the sump of the countercurrent washing column 25 and from there through line 26 into separating tank 27. The calcium chloride solution is withdrawn from the separating tank through line 28 and is freed from the water absorbed during the gas treating process in vaporizing means 29 and it is again brought to its original concentration. The concentrated liquor is then flowed through line 30 to cooling means 31 where it is cooled to a temperature of about —20°, and it is then flowed either through line 32 and line 22 to the cocurrent washer 19 or through line 33 to the countercurrent washer 25.

The solvent naphtha separated in separating tank 27 is withdrawn through line 34 and is flowed to a still 35 from which the benzol vapors leave through line 36. The solvent naphtha is discharged through line 37, is cooled in cooler 38, and then is flowed through line 39 to cooling means 40, in which it is cooled to a temperature of about −20° C. The cold solvent naphtha is partially supplied to the haed of column 25 through line 41 and to the lower part of the countercurrent washing column 25 through line 42.

The gas cooled to a temperature of −15° C. in the concurrent washer 19 flows through line 43 to the lower part of countercurrent washing column 25 which is provided with bubble cap trays. Cold solvent naphtha alone, which is supplied to the top plate of this lower section through line 42, is present on the lower plates of this column. By the heat of solution released in the absorption of the benzol, the temperature of the gas rises to a value of about −10° C. The benzol content of the gas is decreased to about 2 to 2.2 gr. per normal cubic meter.

The gas leaves this first solvent countercurrent washing stage at a temperature of about −10° C. and flows in the next section of the countercurrent column in which it comes in contact with a mixture of cold calcium chloride liquor which is supplied through line 33 and cold solvent naphtha which is supplied to the head of the column through line 41. This section of the column serves to again reduce the temperature of the gas which was increased by the heat of solution released in the lower part of the column; care is taken by the presence of solvent naphtha that the mixture of the solution of solvent naphtha and benzol has a sufficiently low solidification point to permit a cooling of the gas to a temperature of about −18 to −19° C. The mixture of calcium chloride liquor and solvent naphtha containing benzol flows through line 44 into the sump of the column. The gas then flows into the uppermost section of the countercurrent column in which a subsequent washing with only cold solvent naphtha takes place in order to stabilize the temperature of the gas finally at a value of about −17° C. and still wash out so much benzol thereby that the final benzol content of the gas is below 0.3 gr., and insofar as possible below 0.25 gr. per normal cubic meter. The gas leaves the countercurrent washer 25 at a temperature of about −17° C. through line 45, gives up its cold in both heat exchangers 11 and 12 to the fresh gas, and it is finally withdrawn through line 46 at a temperature of about +10° C.

A higher boiling light oil fraction can also be used as solvent for benzol instead of solvent naphtha. In place of the latter, other benzol solvents can also be used which have a similar boiling range as solvent naphtha, for example "Arsole."

The process of the invention relates to the treatment of gases which are under increased pressure. There are no upper limits set for the pressure to be used. The lowest pressure which the gas should have in order to be treated with the aid of the present process is determined by the expenditure which must be made for the production of cold. The cheaper is the cooling of the calcium chloride liquor and the solvent naphtha, the lower can be the pressure of the gas. However, it has been ascertained that a pressure of about 6 atmospheres represents the lower limit and that higher pressures of about 8 or 10 atmospheres are especially favorable conditions for carrying out the process of the invention.

I claim:

1. In a process for the recovery of benzene hydrocarbons from gases under increased pressure, especially coal distillation gases, by cooling the gas to a final temperature of about −17° C. with trouble free operation over a long period of time without shutdown at intervals for thawing of deposits of ice or benzol by direct contact with intensely cooled calcium chloride liquor in the presence of a solvent for benzol which solidifies at low temperature, the steps of: condensing benzol from the gas by cooling the gas first in cocurrent direct contact flow with intensely cooled calcium chloride and solvent liquor to a temperature below about −12° C., during which flow sufficient solvent naphtha is added to the gas that the solidification point of the benzol-solvent naphtha solution is about −22° C.; then washing the cooled gas in countercurrent flow with intensely cooled solvent naphtha alone; then further cooling the gas in direct countercurrent contact with a mixture of intensely cooled solvent naphtha and calcium chloride liquor; and finally further washing the gas countercurrently with intensely cooled solvent naphtha alone to a temperature of about −17° C., leaving a final benzol content below 0.3 gr., in the final outflow gas.

2. Process of claim 1, in which the untreated gas is brought in indirect heat exchange, before introduction into the first cocurrent cooling apparatus, first in cocurrent flow and then in countercurrent flow with the final outflow cold treated gas.

References Cited in the file of this patent

UNITED STATES PATENTS

| 2,219,782 | Maiuri | Oct. 29, 1940 |
| 2,880,591 | Kwauk | Apr. 7, 1959 |

FOREIGN PATENTS

| 458,052 | Great Britain | Dec. 11, 1936 |

OTHER REFERENCES

Chemical Engineer's Handbook (Perry), published by McGraw-Hill (New York), 1950 (page 1694 relied on).